United States Patent
Singh et al.

(10) Patent No.: US 11,611,523 B1
(45) Date of Patent: Mar. 21, 2023

(54) DISPLAYING A SPONSORED CONTENT ITEM IN CONJUNCTION WITH MESSAGE THREADS BASED ON LIKELIHOOD OF MESSAGE THREAD SELECTION

(71) Applicant: Meta Platforms, Inc., Menlo Park, CA (US)

(72) Inventors: Dheeraj Kumar Singh, Redwood City, CA (US); You Zhou, San Francisco, CA (US); William Brock Overcash, Mountain View, CA (US); Clare Rubin, Portola Valley, CA (US); Aditya Gopal Bhandarkar, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 3 days.

(21) Appl. No.: 16/936,326

(22) Filed: Jul. 22, 2020

(51) Int. Cl.
| | |
|---|---|
| *H04L 51/216* | (2022.01) |
| *G06Q 30/02* | (2012.01) |
| *H04L 51/52* | (2022.01) |
| *G06Q 50/00* | (2012.01) |
| *H04L 51/063* | (2022.01) |
| *G06Q 30/0241* | (2023.01) |

(52) U.S. Cl.
CPC ........ *H04L 51/216* (2022.05); *G06Q 30/0277* (2013.01); *G06Q 50/01* (2013.01); *H04L 51/063* (2013.01); *H04L 51/52* (2022.05)

(58) Field of Classification Search
None
See application file for complete search history.

(56) References Cited

U.S. PATENT DOCUMENTS

| | | | |
|---|---|---|---|
| 10,037,543 B2* | 7/2018 | Lee .................... | G06Q 30/0243 |
| 2007/0256095 A1* | 11/2007 | Collins .................. | G06Q 30/02 |
| | | | 725/35 |
| 2014/0129331 A1* | 5/2014 | Spivack ............. | G06Q 30/0255 |
| | | | 705/14.53 |
| 2014/0379473 A1* | 12/2014 | Zhou .................. | G06Q 30/0256 |
| | | | 705/14.54 |
| 2015/0332314 A1* | 11/2015 | Chakraborty ...... | G06Q 30/0246 |
| | | | 705/14.45 |
| 2016/0323218 A1* | 11/2016 | Sadanandan ............ | H04L 51/22 |
| 2017/0061462 A1* | 3/2017 | Bhalgat .................... | H04L 51/32 |
| 2018/0083896 A1* | 3/2018 | Jayaram ................ | H04W 4/025 |

* cited by examiner

*Primary Examiner* — Tonia L Dollinger
*Assistant Examiner* — Jonathan A Sparks
(74) *Attorney, Agent, or Firm* — Fenwick & West LLP (57) ABSTRACT

A messaging application provides a user interface displaying a user's threads, where each thread includes at least one message between the user and another user. Via the user interface, the user may select a thread to access messages in the thread or to add one or more messages to the thread. The messaging application also displays a sponsored content item along with the threads, but displays the sponsored content item below threads having unread messages to avoid reducing engagement with threads the user is likely to select. In some embodiments, the messaging application predicts a probability that displaying the sponsored content item above a thread including an unread message thread will cause the user not to engage with the thread and displays the sponsored content item above the thread including the unread message if the predicted probability is below a threshold.

19 Claims, 3 Drawing Sheets

DISPLAYING A SPONSORED CONTENT ITEM IN CONJUNCTION WITH MESSAGE THREADS BASED ON LIKELIHOOD OF MESSAGE THREAD SELECTION

BACKGROUND

This disclosure relates generally to display of content by an application, and more specifically to displaying a sponsored content item along with message threads by accounting for user likelihood of message thread selection.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users.

Additionally, many online systems allow their users to exchange messages via a network and the online system. An online system may provide an application for execution on client devices associated with online system users that allows the users to send messages to other users via the online system and to receive messages from other users via the online system. The application displays threads of messages to a user of a client device, with different threads including messages between the user and different receiving users of the online system. The user selects a thread displayed by the application to view messages in the thread or to add one or more additional messages to the thread.

Many online systems also commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

An application identifying threads of messages including a user of the online system may display one or more sponsored content items in conjunction with information identifying threads of messages. While display of a sponsored content item along with information identifying threads may increase an amount of revenue obtained by an online system exchanging messages included in the different threads, displaying a sponsored content item along with information identifying different threads displaces information identifying one or more threads, increasing an amount of effort for a user to identify the one or more threads via the application. For example, displaying a sponsored content item in a specific location of an interface generated by the application displaces information identifying one or more threads from initial presentation by the application on a client device having a display device with limited area (e.g., a display device of a mobile device). Such a displacement of information identifying one or more threads increases an amount of user interaction with the application to view or to access the information identifying the displaced threads, which may decrease use of the online system by users to exchange messages.

SUMMARY

A client device of a user of an online system executes an application associated with the online system. The online system allows the user to transmit a message including content comprising text data, image data, video data, audio data, or any combination thereof one or more other receiving users via the online system. Similarly, the online system allows the user to receive one or more messages from other users. Using the application executing on the client device, the user provides content comprising a message to the online system along with an identifier of a receiving user to receive the message, and the online system communicates the message to the receiving user. Similarly, the user views content included in one or more messages from other users via the application.

The application executing on the client device receives messages from other users of the online system for the user and receives messages from the user for transmission to one or more receiving users and displays different threads including messages between the user and one or more receiving users. In various embodiments, different threads include messages to at least one different receiving user than other threads. In some embodiments, the application displays a unique identifier corresponding to each thread. For example, the application displays names or images identifying one or more receiving users in a thread to identify the thread.

The application executing on the client device and associated with the online system receives a sponsored content item from the online system. The sponsored content item includes content for presentation to the user, as well as a bid amount specifying an amount of compensation the online system receives when the content from the sponsored content item is displayed to a user or when the user performs a specific action after the content from the sponsored content item is displayed to the user. In various embodiments, the bid amount is included in the sponsored content item by a publishing user from whom the online system obtained the sponsored content item. Alternatively, the online system determines the bid amount for the sponsored content item. In various embodiments, the application receives the sponsored content item in response to requesting once or more sponsored content items from the online system. Alternatively, the application periodically receives one or more sponsored content items from the online system.

When the user selects or accesses the application via the client device, the application retrieves a set of threads maintained by the online system for the user. Each thread includes one or more messages between the user and at least one receiving user of the online system. To simplify interaction with the threads, the application executing on the client device determines an order of the set of threads. The order includes different positions, with different threads corresponding to different positions. In various embodiments, the order of the set of threads places threads having at least one message that the user has not read in higher positions of the order than other threads that do not include at least one message that the user has not read. The user has "read" a message when the user views the message via the application. In some embodiments, the user has "read" a message when the message is displayed by the application for at least a threshold amount of time.

In various embodiments, the application determines the order of the threads based on times when messages were included in threads. For example, the application identifies threads including at least one unread message and determines the order of the identified threads so identified threads to which a message was included at more recent times have higher positions. Hence, a thread including an unread message to which a message was most recently included has a highest position in the order. Similarly, the application places threads that do not include at least one unread message in positions so threads to which messages were more recently included have higher positions in the order; however, threads that do not include at least one unread message have lower positions in the order than threads that include at least one unread message.

Alternatively, the application determines the order of the threads based on likelihoods of the user selecting or accessing different threads. In various embodiments, the application determines a likelihood of the user selecting a thread based on a frequency with which the user has previously read messages included in the thread or included messages into the thread, a frequency with which the user selects or accesses the thread, or any other suitable information. Additionally, the application may use information maintained by the online system about the user and the one or more receiving users in different threads to determine likelihoods of the user selecting different threads. For example, the application accounts for an affinity of the user to the one or more receiving users in a thread to determine a likelihood of the user selecting the thread, so a thread including one or more receiving users to which the user has higher affinities has a higher likelihood of being selected by the user. In other examples, the application accounts for an amount (e.g., a number, a percentage) of characteristics of the user maintained by the online system matching or similar to characteristics of one or more receiving users maintained by the online system a number of actions between the user and the one or more receiving users maintained by the online system 140, or any other suitable characteristics or combination of characteristics of the user and the one or more receiving users included in a thread to determine the likelihood of the user selecting a thread.

The application generates an interface that displays different threads of the set in different locations corresponding to the order of the set of threads. For example, a thread having a highest position in the order is displayed in a location of the display device nearest a top boundary of the display device. In various embodiments, the interface divides the display area into multiple slots with each slot displaying a thread and different slots corresponding to different positions of the order. The application may determine a number of slots, or a number of threads to identify via the interface, based on a size of a display device of the client device executing the application. For example, the application determines dimensions of the display device and equally divides one dimension (e.g., a horizontal dimension, a vertical dimension) of the display device into slots for displaying information identifying a number of threads.

The application also displays the sponsored content item in the interface in conjunction with the one or more threads. To prevent display of the sponsored content item impairing the user from interacting with threads including at least one unread message, in various embodiments, the application displays the sponsored content item in a location of the interface that is lower than all of the threads including at least one unread message, in various embodiments. For example, the application identifies threads including at least one unread message and identifies slots of the interface in which the threads including at least one unread message are displayed. The application displays the sponsored content item in a slot that is below the identified slots including at least one unread message. This placement of the sponsored content item relative to threads including at least one unread message prevents display of the sponsored content item from distracting the user from threads including at least one unread message, and prevents display of the sponsored content item from displacing a thread including at least one unread message from display in the display device of the client device.

Alternatively, the application determines a probability of the user selecting a thread including at least one message that the user has not read when the thread is displayed in a specific location of the interface corresponding to a position of the order. In various embodiments, the application determines the likelihood of the user selecting a thread when presented in the location of the interface based on a frequency with which the user has previously read messages included in other threads that were previously displayed in the specific location of the interface during a time interval. For example, the application determines the likelihood of the user selecting a thread presented in the location of the interface as a ratio of number of selections of threads previously displayed in the location of the interface to a total number of times threads displayed in the location of the interface during a time interval. In some embodiments, the application determines likelihoods of the user selecting threads displayed in different locations of the interface corresponding to different positions in the order based on prior selection of threads presented in different locations of the interface and stores associations between the likelihoods and different locations in the interface in association with the user.

Additionally, the application may use information maintained by the online system about one or more receiving users associated with the thread to be presented in the specific location of the interface along with prior selection of threads displayed in the specific location of the interface by the user when determining the likelihood of the user selecting the thread when presented in the specific location of the interface. For example, the application accounts for an affinity of the user to the one or more receiving users in the thread to be presented in the specific location of the interface to determine the likelihood of the user selecting the thread, so a thread including one or more receiving users to which the user has higher affinities has a higher likelihood of being selected by the user. In other examples, the application accounts for an amount (e.g., a number, a percentage) of characteristics of the user maintained by the online system matching or similar to characteristics of one or more receiving users maintained by the online system, a number of actions between the user and the one or more receiving users maintained by the online system, a number of connections to other users common to the user and to the receiving user or any other suitable characteristics or combination of characteristics of the user and the one or more receiving users included in a thread to determine the likelihood of the user selecting a thread. Hence, the application may account for prior selection of threads previously presented in the specific location by the user as well as characteristics of the user and of one or more receiving users in the thread to be presented in the specific location of the interface when determining the likelihood of the user selecting the thread to be presented in the specific location of the interface in various embodiments. The application may apply one or more trained models to the specific location of the interface and to characteristics of the thread to be presented in the specific location of the interface to determine 320 the likelihood of the user interacting with the thread to be presented in the specific location of the interface.

The application identifies the specific location of the interface using different criteria in one or more embodiments. For example, the application identifies the specific location based on dimensions of a display device of the client device, so the specific location is visible on the display device and nearest a lower boundary of the display device. In some embodiments, the application identifies the specific location as a slot of the interface that is nearest to the lower boundary of the display device. However, the application may identify the specific location using any suitable criteria in various embodiments.

The application compares the likelihood of the user interacting with the thread, which includes at least one unread message, to be presented in the specific location of the interface to a threshold value. In various embodiments, the threshold value specifies a minimum likelihood of the user selecting the thread including at least one unread message when presented in the specific location of the interface. The threshold value may be specified by the online system or by the application in various embodiments. Alternatively, the threshold value is based on the bid amount of the sponsored content item. In some embodiments, the application applies a conversion factor to the bid amount of the sponsored content item to convert the bid amount into a likelihood of interaction, and compares the likelihood of the user interacting with the thread, which includes at least one unread message, to be presented in the specific location of the interface to the likelihood of interaction determined from the bid amount. Alternatively, the application applies a conversion factor to the likelihood of the user interacting with the thread, which includes at least one unread message, to be presented in the specific location of the interface to determine a monetary value corresponding to the likelihood of the user interacting with the thread, which includes at least one unread message, to be presented in the specific location of the interface.

In response to determining the likelihood of the user interacting with the thread including at least one unread message to be presented in the specific location of the interface being less than threshold value, the application displays the sponsored content item in a location of the interface that is not below the specific location of the interface (e.g., in the specific location, in a location of the interface above the specific location), while displaying the thread including at least one unread message in another location of the interface below the specific location of the interface. Hence, the application displaces the thread including at least one unread message to a lower location of the interface by displaying the sponsored content item in a location of the interface above the lower location in which the thread including at least one unread message is displayed. If the specific location is visible on the display device of the client device and nearest a lower boundary of the display device, responsive to the likelihood of the user interacting with the thread including at least one unread message to be presented in the specific location of the interface being less than threshold value, the application displays the sponsored content item in a location of the interface visible on the display device, while the thread including the at least one unread message to be presented in the specific location of the interface is displayed in a lower location of the interface that is not initially visible via the display device. Accounting for the likelihood of the user interacting with the thread including at least one unread message to be presented in the specific location of the interface prevents the application from displaying the sponsored content item when displaying the sponsored content item in a location of the interface would prevent the user from easily viewing a thread including an unread message that the user has at least the threshold likelihood of interacting via the interface.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
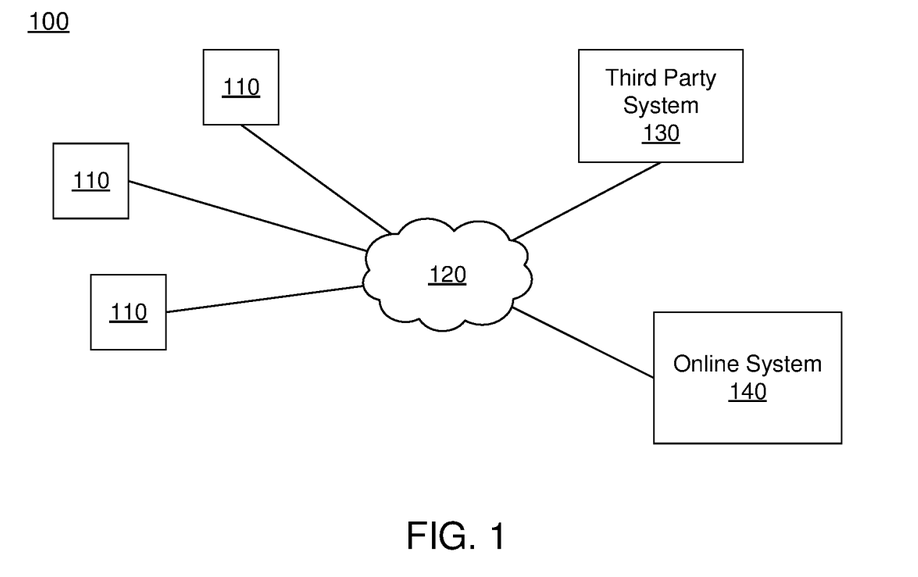
FIG. 1 is a block diagram of a system environment in which an online system operates, in accordance with an embodiment.

FIG. 1 is a block diagram of a system environment 100 for an online system 140.

The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

A client device 110 executes an application associated with the online system 140 that transmits messages from a user of the client device 110 to one or more receiving users of the online system 140 via the network 120 and the online system 140. The application also receives messages from other users of the online system 140 via the network 120 and displays the received messages to the user via a display device of the client device 110. To allow the user to more easily transmit and receive messages, the application groups messages into different threads, with a thread including messages associated with a common receiving user or with a common group of receiving users. Hence, different threads include messages associated with different receiving users. The application identifies different threads in different locations of an interface. For example, the application displays information identifying receiving users associated with different threads in different locations of the interface. As further described below in conjunction with FIGS. 3-4C, the application also displays one or more sponsored content items in the interface along with information identifying threads. To prevent display of a sponsored content item from impairing user interaction with one or more threads, the application accounts for a likelihood of the user selecting threads in different locations of the interface and adjusts display of a sponsored content item to prevent the sponsored content item from displacing threads from being presented in locations where the user has at least a threshold likelihood of selecting the threads, as further described below in conjunction with FIG. 3.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
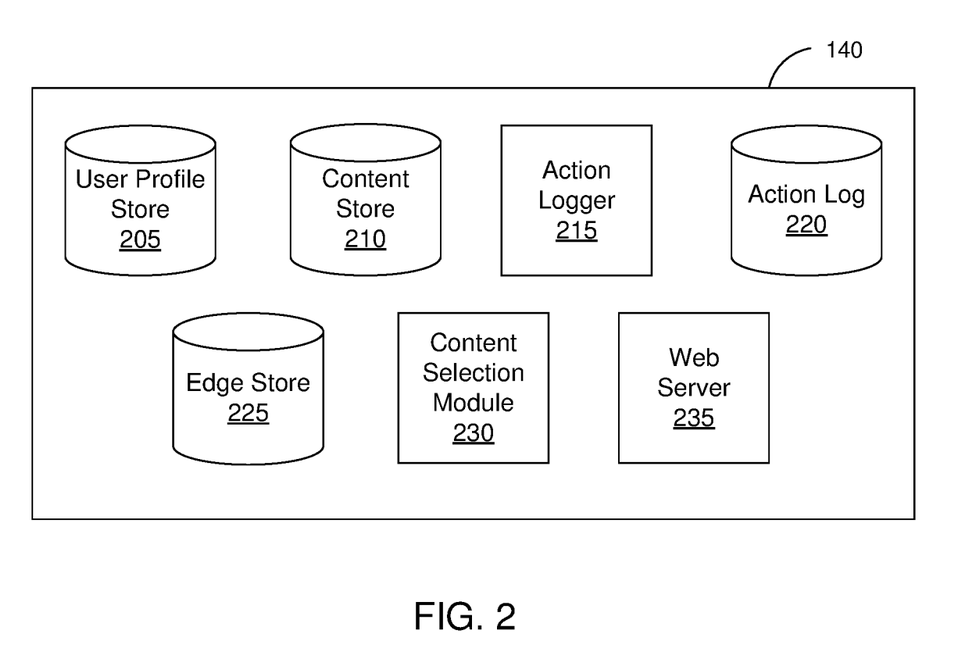
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 are "sponsored content items" that include content for presentation to a user and a bid amount. The content is text, image, audio, video, or any other suitable data presented to a user. In various embodiments, the content also specifies a page of content. For example, a sponsored content item includes a landing page specifying a network address of a page of content to which a user is directed when the content item is accessed. The bid amount is included in a sponsored content item by a user and is used to determine an expected value, such as monetary compensation, provided by the user to the online system 140 if content in the sponsored content item is presented to a viewing user, if the content in the sponsored content item receives an interaction from the viewing user when presented, or if any suitable condition is satisfied when content in the sponsored content item is presented to a user. For example, the bid amount included in a sponsored content item specifies a monetary amount that the online system 140 receives from a user who provided the sponsored content item to the online system 140 if content in the sponsored content item is displayed. In some embodiments, the expected value to the online system 140 of presenting the content from the sponsored content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items, such as sponsored content items, may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item, such as a sponsored content item, may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Additionally, in various embodiments, the content store 210 includes one or more content reels, with each content reel including one or more content items. A content reel includes one or more content items and an order in which the content items are displayed when the content reel is displayed. A user selects content items for inclusion in a content reel, and the content store 210 stores an identifier of content reel in association with an identifier of the user and with identifiers of content items included in the content reel, and the order in which the content items are to be displayed. In various embodiments, content items are included in a content reel for a specific amount of time, and a content item is removed from the content reel after the specific amount of time from the inclusion of the content item in the content reel. For example, the online system 140 removes an association between an identifier of a content item and an identifier of a content reel 24 hours after a time when the content item was included in the content reel by a user associated with the content reel.

The action logger 215 receives communications about user actions (or "interactions") internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a reaction to an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

In various embodiments, the content selection module 230 receives messages from a user and transmits the messages to one or more receiving users. The content selection module 230 similarly receives messages from a sending user and transmits the message to the user. For example, the content selection module 230 receives a message from a user and transmits the message to a client device 110 associated with a receiving user for presentation to the receiving user.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
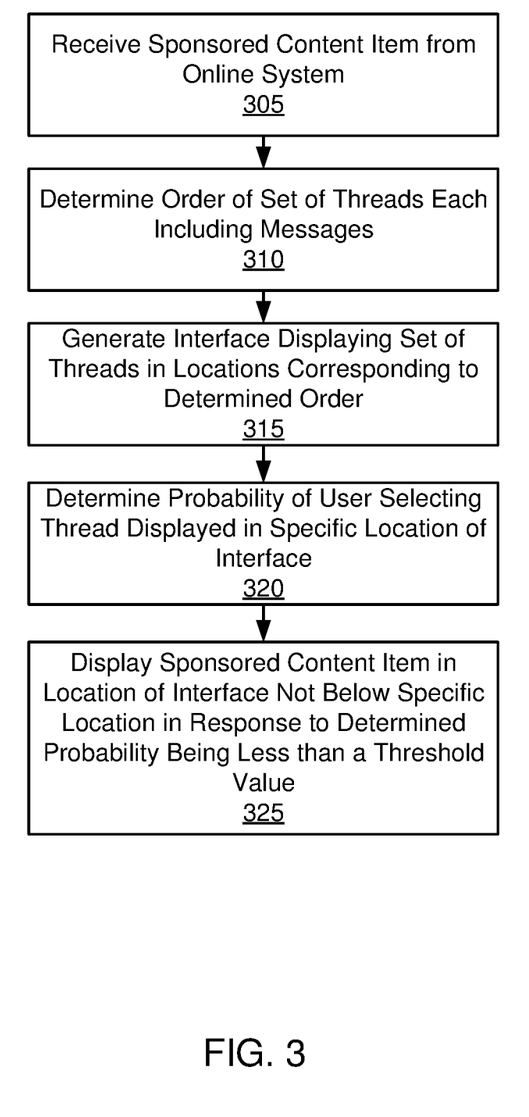
FIG. 3 is a flowchart of a method for including a sponsored content item in an interface displaying information identifying threads of messages associated with a user of an online system, in accordance with an embodiment.

Including a Sponsored Content Item with Threads of Messages Associated with a User FIG. 3 is a flowchart of one embodiment of a method for including a sponsored content item in an interface displaying information identifying threads of messages associated with a user of an online system 140. In various embodiments, the method may include different or additional steps than those described in conjunction with FIG. 3. Additionally, in some embodiments, the method may perform the steps in different orders than the order described in conjunction with FIG. 3.

A client device 110 of a user executes an application associated with an online system 140, as further described above in conjunction with FIG. 2. The online system 140 allows a user to transmit a message including content comprising text data, image data, video data, audio data, or any combination thereof to another user via the online system 140. Similarly, the online system 140 allows the other user to transmit a message to the user via the online system 140. Using the application executing on the client device 110 the user provides content comprising a message to the online system 140 along with an identifier of a receiving user to receive the message, and the online system 140 communicates the message to the receiving user. Similarly, the user views content included in one or more messages from other users via the application.

The application executing on the client device 110 receives messages from other users of the online system 140 for the user and receives messages from the user for transmission to one or more receiving users. Additionally, the application displays different threads that each include messages between the user and different receiving users. In various embodiments, different threads include messages to at least one different receiving user than other threads. In some embodiments, the application displays a unique identifier corresponding to each thread. For example, the application displays names identifying one or more receiving users in a thread to identify the thread; in some embodiments, the application also displays an image or other information identifying one or more of the receiving users in a thread when identifying the thread.

The application executing on the client device 110 and associated with the online system 140 receives 305 a sponsored content item from the online system. As further described above in conjunction with FIG. 2, the sponsored content item includes content for presentation to the user, as well as a bid amount specifying an amount of compensation the online system 140 receives when the content from the sponsored content item is displayed to a user or when the user performs a specific action after the content from the sponsored content item is displayed to the user. In various embodiments, the bid amount is included in the sponsored content item by a publishing user from whom the online system 140 obtained the sponsored content item. Alternatively, the online system 140 determines the bid amount for the sponsored content item. In various embodiments, the application receives 305 the sponsored content item in response to requesting once or more sponsored content items from the online system 140. Alternatively, the application periodically receives 305 one or more sponsored content items from the online system 140.

When the user selects or accesses the application via the client device 110, the application retrieves a set of threads maintained by the online system 140 for the user. Each thread includes one or more messages between the user and at least one receiving user of the online system 140. In various embodiments, a thread includes messages between the user and the one or more receiving users in a chronological order.

To simplify interaction with the threads, the application executing on the client device 110 determines 310 an order of the set of threads. The order includes different positions, with different threads corresponding to different positions. In various embodiments, the order of the set of threads places threads having at least one message that the user has not read in higher positions of the order than other threads that do not include at least one message that the user has not read. The user has "read" a message when the user views the message via the application. In some embodiments, the user has "read" a message when the message is displayed by the application for at least a threshold amount of time.

In various embodiments, the application determines 310 the order of the threads based on times when messages were included in threads. For example, the application identifies threads including at least one unread message and determines 310 the order of the identified threads so identified threads to which a message was included at more recent times have higher positions. Hence, a thread including an unread message to which a message was most recently included has a highest position in the order. Similarly, the application places threads that do not include at least one unread message in positions so threads to which messages were more recently included have higher positions in the order; however, threads that do not include at least one unread message have lower positions in the order than threads that include at least one unread message.

Alternatively, the application determines 310 the order of the threads based on likelihoods of the user selecting or accessing different threads. In various embodiments, the application determines a likelihood of the user selecting a thread based on a frequency with which the user has previously read messages included in the thread or included messages into the thread, a frequency with which the user selects or accesses the thread, or any other suitable information. Additionally, the application may use information maintained by the online system 140 about the user and the one or more receiving users in different threads to determine likelihoods of the user selecting different threads. For example, the application accounts for an affinity of the user to the one or more receiving users in a thread to determine a likelihood of the user selecting the thread, so a thread including one or more receiving users to which the user has higher affinities has a higher likelihood of being selected by the user. In other examples, the application accounts for an amount (e.g., a number, a percentage) of characteristics of the user maintained by the online system 140 matching or similar to characteristics of one or more receiving users maintained by the online system 140, a number of actions between the user and the one or more receiving users maintained by the online system 140, or any other suitable characteristics or combination of characteristics of the user and the one or more receiving users included in a thread to determine the likelihood of the user selecting a thread. For example, the application identifies threads including at least one unread message and determines 310 the order of the identified threads so identified threads having a higher likelihood of being selected by the user have higher positions. Hence, a thread including an unread message to which the user has a maximum likelihood of selecting has a highest position in the order. Similarly, the application places threads that do not include at least one unread message in positions so threads with which the user has higher likelihoods of selecting have higher positions in the order; however, threads that do not include at least one unread message have lower positions in the order than threads that include at least one unread message.

The application generates 315 an interface that displays the set of threads in positions corresponding to the order of the set of threads. The interface displays different threads in different locations of a display device of the client device 110 that correspond to different positions in the order of the set of threads. For example, a thread having a highest position in the order is displayed in a location of the display device nearest a top boundary of the display device. In various embodiments, the interface divides the display area into multiple slots with each slot displaying a thread and different slots corresponding to different positions of the order. The application may determine a number of slots, or a number of threads to identify via the interface, based on a size of a display device of the client device 110 executing the application. For example, the application determines dimensions of the display device and equally divides one dimension (e.g., a horizontal dimension, a vertical dimension) of the display device to The application also displays the sponsored content item in the interface in conjunction with the one or more threads. To prevent display of the sponsored content item impairing the user from interacting with threads including at least one unread message, in various embodiments, the application displays the sponsored content item in a location of the interface that is lower than all of the threads including at least one unread message, in various embodiments. For example, the application identifies threads including at least one unread message and identifies slots of the interface in which the threads including at least one unread message are displayed. The application displays the sponsored content item in a slot that is below the identified slots including at least one unread message. This placement of the sponsored content item relative to threads including at least one unread message prevents display of the sponsored content item from distracting the user from threads including at least one unread message, and prevents display of the sponsored content item from displacing a thread including at least one unread message from display in the display device of the client device 110. Thus, the application selects a location of the interface for the sponsored content item that is below each location of the interface corresponding to positions of the order including threads having at least one unread message. The application displays the interface including the sponsored content item in the selected location and including threads including at least one unread message in locations above the selected location.

Alternatively, the application determines 320 a probability of the user selecting a thread including at least one message that the user has not read when the thread is displayed in a specific location of the interface corresponding to a position of the order. In various embodiments, the application determines 320 the likelihood of the user selecting a thread when presented in the location of the interface based on a frequency with which the user has previously read messages included in other threads that were previously displayed in the specific location of the interface during a time interval. For example, the application determines 320 the likelihood of the user selecting a thread presented in the location of the interface as a ratio of number of selections of threads previously displayed in the location of the interface to a total number of times threads displayed in the location of the interface during a time interval. In some embodiments, the application determines likelihoods of the user selecting threads displayed in different locations of the interface corresponding to different positions in the order based on prior selection of threads presented in different locations of the interface and stores associations between the likelihoods and different locations in the interface in association with the user.

The application identifies the specific location of the interface using different criteria in one or more embodiments. For example, the application identifies the specific location based on dimensions of a display device of the client device 110, so the specific location is visible on the display device and nearest a lower boundary of the display device. In some embodiments, the application identifies the specific location as a slot of the interface that is nearest to the lower boundary of the display device. However, the application may identify the specific location using any suitable criteria in various embodiments.

Additionally, the application may use information maintained by the online system 140 about one or more receiving users associated with the thread to be presented in the specific location of the interface along with prior selection of threads displayed in the specific location of the interface by the user when determining 320 the likelihood of the user selecting the thread when presented in the specific location of the interface. For example, the application accounts for an affinity of the user to the one or more receiving users in the thread to be presented in the specific location of the interface to determine 320 the likelihood of the user selecting the thread, so a thread including one or more receiving users to which the user has higher affinities has a higher likelihood of being selected by the user. In other examples, the application accounts for an amount (e.g., a number, a percentage) of characteristics of the user maintained by the online system 140 matching or similar to characteristics of one or more receiving users maintained by the online system 140, a number of actions between the user and the one or more receiving users maintained by the online system 140, a number of connections to other users common to the user and to the receiving user or any other suitable characteristics or combination of characteristics of the user and the one or more receiving users included in a thread to determine 320 the likelihood of the user selecting a thread. Hence, the application may account for prior selection of threads previously presented in the specific location by the user as well as characteristics of the user and of one or more receiving users in the thread to be presented in the specific location of the interface when determining 320 the likelihood of the user selecting the thread to be presented in the specific location of the interface in various embodiments. The application may apply one or more trained models to the specific location of the interface and to characteristics of the thread to be presented in the specific location of the interface to determine 320 the likelihood of the user interacting with the thread to be presented in the specific location of the interface.

In one embodiment, a model applied by the application to a specific location of the interface, or to the specific location of the interface and the thread to be presented in the specific location of the interface receives user characteristics and contextual features. Example contextual features the model receives as input include a number of locations of the interface above the specific location, a number of messages in threads to be presented in locations of the interface above the specific location, a number of messages in the thread to be presented in the specific location, a number of locations in the interface above the specific interface presenting sponsored content items, an affinity of the user for a receiving user associated with the thread to be presented in the specific location, and any other suitable characteristics. From the user characteristics and the contextual features, the model outputs a likelihood, or a prediction, of the user interacting with the thread to be presented in the specific location of the interface. In various embodiments, the application trains the model based on prior user interactions with threads previously presented in the specific location of the interface. For example, the application applies a label indicating whether the user interacted with a thread previously presented in the specific location of the interface to user characteristics and contextual features corresponding to prior presentation of the thread in the specific location. From the labeled user characteristics and contextual features corresponding to prior presentation of the thread in the specific location, the application trains the model using any suitable training method or combination of training methods. After training, the application applies the trained models to user characteristics and contextual features of a thread to be presented in the specific location, and the model outputs a likelihood of the user interacting with the thread to be presented in the specific location. As further described below, the application users the likelihood output by the trained model to determines a location in the interface for presenting the sponsored content item.

The application compares the likelihood of the user interacting with the thread, which includes at least one unread message, to be presented in the specific location of the interface to a threshold value. In various embodiments, the threshold value specifies a minimum likelihood of the user selecting the thread including at least one unread message when presented in the specific location of the interface. The threshold value may be specified by the online system 140 or by the application in various embodiments. Alternatively, the threshold value is based on the bid amount of the sponsored content item. In some embodiments, the application applies a conversion factor to the bid amount of the sponsored content item to convert the bid amount into a likelihood of interaction, and compares the likelihood of the user interacting with the thread, which includes at least one unread message, to be presented in the specific location of the interface to the likelihood of interaction determined from the bid amount. Alternatively, the application applies a conversion factor to the likelihood of the user interacting with the thread, which includes at least one unread message, to be presented in the specific location of the interface to determine a monetary value corresponding to the likelihood of the user interacting with the thread, which includes at least one unread message, to be presented in the specific location of the interface.

In response to determining the likelihood of the user interacting with the thread including at least one unread message to be presented in the specific location of the interface being less than threshold value, the application displays 325 the sponsored content item in a location of the interface that is not below the specific location of the interface (e.g., in the specific location, in a location of the interface above the specific location), while displaying the thread including at least one unread message in another location of the interface below the specific location of the interface. Hence, the application displaces the thread including at least one unread message to a lower location of the interface by displaying 325 the sponsored content item in a location of the interface above the lower location in which the thread including at least one unread message is displayed. If the specific location is visible on the display device of the client device 110 and nearest a lower boundary of the display device, responsive to the likelihood of the user interacting with the thread including at least one unread message to be presented in the specific location of the interface being less than threshold value, the application displays 325 the sponsored content item in a location of the interface visible on the display device, while the thread including the at least one unread message to be presented in the specific location of the interface is displayed in a lower location of the interface that is not initially visible via the display device. Accounting for the likelihood of the user interacting with the thread including at least one unread message to be presented in the specific location of the interface prevents the application from displaying the sponsored content item when displaying the sponsored content item in a location of the interface would prevent the user from easily viewing a thread including an unread message that the user has at least the threshold likelihood of interacting via the interface.

If the application determines the threshold value from the bid amount of the sponsored content item, the application displays the sponsored content item in a location of the interface that is not below the specific location (e.g., in the specific location, in a location of the interface above the specific location) in response to the likelihood of the user interacting with the thread including at least one unread message to be presented in the specific location of the interface being less than the likelihood of interaction determined from application of the conversion factor to the bid amount. Alternatively, the application displays the sponsored content item in a location of the interface that is not below the specific location (e.g., in the specific location, in a location above the specific location) in response to the bid amount of the sponsored content item being greater than a monetary value determined from application of the conversion factor to the likelihood of the user interacting with the thread including least one unread message, to be presented in the specific location of the interface. Accounting for the bid amount included in the sponsored content item allows the application to account for different values to the online system 140 from presentation of the sponsored content item, more particularly tailoring display of the sponsored content item along with the threads via the interface to specific sponsored content items.

However, in response to determining that the likelihood of the user interacting with the thread including at least one unread message to be presented in the specific location of the interface is not less than threshold value, the application displays the thread including the at least one unread message in the specific location of the interface and determines an alternative location of the interface. In various embodiments, the alternative location of the interface is lower in the interface than the specific location. For example, if the specific location is a location of the interface that is visible via the display device and nearest the lower boundary of the display device of the client device 110, the alternative location is a location that is not visible via the display device but within a threshold distance of the lower boundary of the display device. The application determines an alternative probability of the user selecting an additional thread including at least one unread message when presented in the alternative location of the interface, as further described above, and compares the alternative probability to the threshold value, as further described above. In response to determining the alternative probability is less than the threshold value, the application displays the sponsored content item in the alternative location of the interface, and displays the additional thread in another location of the interface that is lower than the alternative location. Hence, the application may iteratively evaluate different locations of the interface for presentation of the sponsored content item to prevent the sponsored content item from displacing threads including at least one unread message to lower locations in the interface unless the user has less than a threshold likelihood of interacting with the threads including at least one unread message.

Figure 4A:
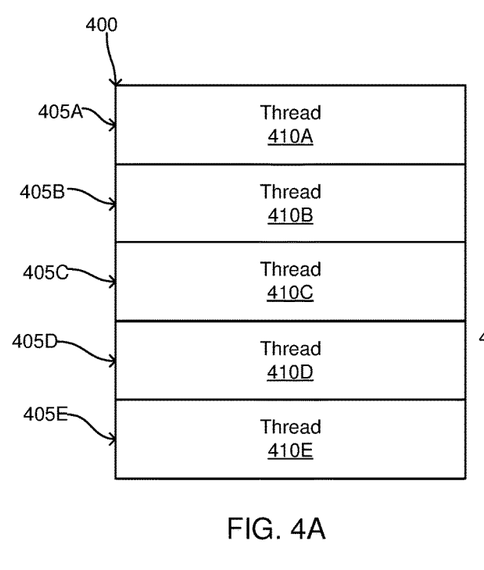
FIGS. 4A-4C are example interfaces displaying information identifying threads of messages associated with a user of an online system, in accordance with an embodiment.
Figure 4B:
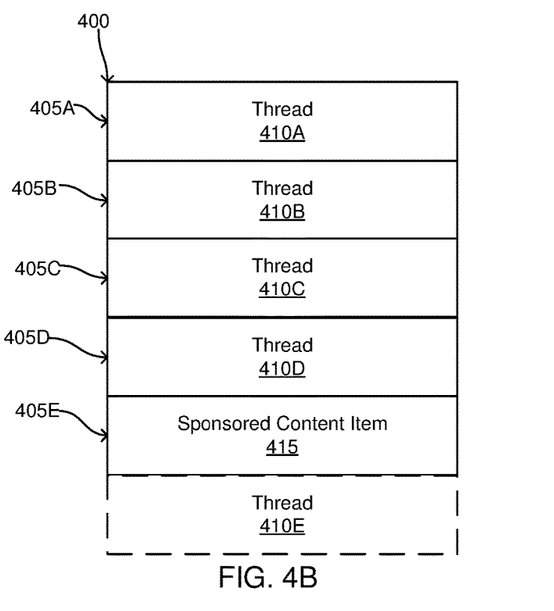
Figure 4C:
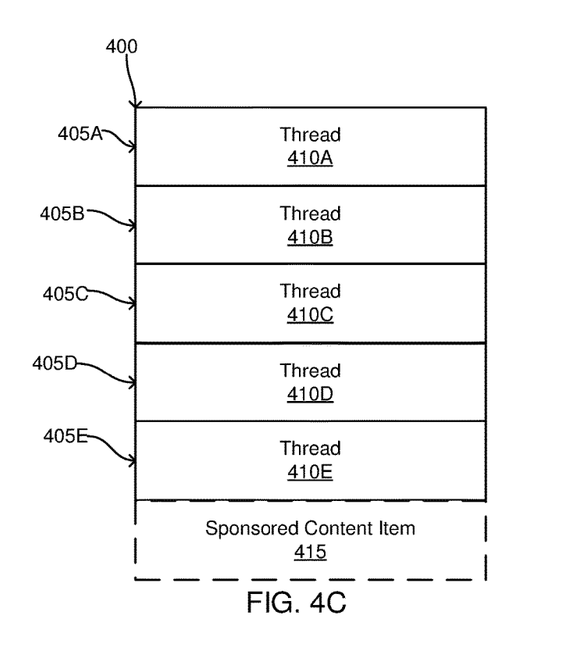

FIGS. 4A-4C show example interfaces identifying threads of messages and displaying a sponsored content item. FIG. 4A shows an interface 400 generated by an application executing on a client device 110 that includes multiple locations 405A-405D, also referred to individually and collectively using reference number 405. Each location 405 includes information identifying a single thread 410A-E, also referred to individually and collectively using reference number 410, such as information identifying one or more receiving users who received at least one message in a thread 410. As further described above in conjunction with FIG. 3, an order for the threads 410A-E is determined, with each position in the order corresponding to a location 405A-E of the interface. In the example of FIG. 4A, thread 410A has a position in the order corresponding to location 405A, while thread 410B has a position in the order corresponding to location 405B. Similarly, thread 410C has a position in the order corresponding to location 405C, and thread 410D has a position in the order corresponding to location 405D. Further, thread 410E has a position in the order corresponding to location 405D. For purposes of illustration, FIG. 4A shows a number of locations 405A-E of the interface 400 that are visible on a display device of a client device 110 at one time; hence, the interface 400 may include additional locations 405 that are not visible on the display device until a user interacts with the interface 400 to alter the locations 405 visible on the display device.

As further described above in conjunction with FIG. 3, the interface 400 also displays a sponsored content item in a location 405 in conjunction with one or more threads 410 displayed in other locations 405. To display the sponsored content item, the application generating the interface 400 selects a specific location of the interface 400 and determines a likelihood of a user selecting a thread 410 when displayed in the specific location of the interface 400, as further described above in conjunction with FIG. 3. In the example of FIG. 4B, the application selects location 405E as the specific location, as location 405E is initially visible on the display device and is nearest a lower boundary of the display device. As further described above in conjunction with FIG. 3, based on prior selection by the user of previously presented threads 405 in location 405E (and optionally based on characteristics of one or more receiving users associated with the thread 410E to be displayed in location 405E), the application determines a likelihood of the user selecting the thread 410E to be displayed in the selected location, location 405E.

In the example of FIG. 4B, the application determines that the likelihood of the user selecting the thread 410E to be displayed in the selected location, location 405E, is less than a threshold value. Hence, the application displays a sponsored content item 415 in the selected location, location 405E, and displays thread 405E in an alternative location 405 of the interface 400 that is lower than the selected location, location 405E. In the example of FIG. 4B, this causes thread 410E to be displayed in a location that is not initially visible on the display device of the client device 110 via the interface 400, causing a user to interact with and navigate through the interface 400 to view thread 410E via the interface 400.

However, if the application determines that the likelihood of the user selecting the thread 410E to be displayed in the selected location, location 405E, is not less than the threshold value, the application displays the sponsored content item 415 in a different location 405 of the interface 400 that is below the selected location, location 405E. FIG. 4C shows the interface 400 when the application determines the likelihood of the user selecting the thread 410E to be displayed in the selected location, location 405E, is not less than the threshold value, where the interface 400 displays thread 410E in location 405E, and displays the sponsored content item 415 in a location 405 of the interface 400 below the selected location, location 405E. Hence, in the example of FIG. 4C, the sponsored content item 415 is displayed in a location 405 that is not initially displayed via the display device. By accounting for the likelihood of the user selecting the thread 410E to be presented in the specific location, location 405E, the application prevents display of the sponsored content item 415 in or above the specific location when the user has at least a threshold likelihood of selecting the thread 410E to be displayed in the specific location, which prevents display of the sponsored content item 415 from affecting user interaction with or selection of a thread with which the user has at least the threshold likelihood of interacting.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a sponsored content item at an application executing on a client device and associated with an online system, the sponsored content item including content and a bid amount specifying an amount of compensation received by the online system;
retrieving a set of threads maintained by the online system, each thread including one or more messages between a user of the online system and at least one receiving user of the online system;
determining an order of the set of threads, the order having threads including at least one message that the user has not read in higher positions than threads that do not include at least one message that the user has not read;
generating an interface displaying the set of threads in positions corresponding to the order of the set of threads;
determining a probability of the user selecting a thread including at least one message that the user has not read when presented in a specific location of the interface corresponding to a position of the order, wherein determining the probability further comprises:
determining dimensions of a display area of the client device,
identifying the specific location of the interface as a location of the interface visible on the display area and nearest a lower boundary of the display area, and
determining the probability of the user selecting the thread when presented at the specific location; and
responsive to determining the probability of the user selecting the thread including at least one message that the user has not read when presented in the specific location of the interface corresponding to the position of the interface is less than a threshold value, displaying the sponsored content item in a location of the interface that is at the specific location of the interface and displaying the thread including at least one message that the user has not read in another location of the interface below the specific location of the interface.

2. The method of claim 1, wherein the threshold value comprises the bid amount of the sponsored content item.

3. The method of claim 2, wherein responsive to determining the probability of the user selecting the thread including at least one message that the user has not read when presented in the specific location of the interface is less than the threshold value comprises:
responsive to determining a product of a conversion factor the probability of the user selecting the thread including at least one message that the user has not read when presented in the specific location of the interface is less than the bid amount of the sponsored content item.

4. The method of claim 1, further comprising:
responsive to determining the probability of the user selecting the thread including at least one message that the user has not read when presented in the specific location of the interface is not less than the threshold value, displaying the thread including at least one message that the user has not read in the specific location and selecting an alternative location of the interface lower than the specific location.

5. The method of claim 4, further comprising:
determining an alternative probability of the user selecting an additional thread including at least one message that the user has not read when presented in the alternative location of the interface; and
responsive to determining the alternative probability of the user selecting the additional thread including at least one message that the user has not read when presented in the alternative location of the interface is less than the threshold value, displaying the sponsored content item in the alternative location and displaying the additional thread including at least one message that the user has not read in another location of the interface lower than the alternative location.

6. The method of claim 1, wherein the probability of the user selecting the thread including at least one message that the user has not read when presented in the specific location of the interface corresponding to a position of the order is based on a number of times the user previously accessed threads presented in the specific location of the interface to a number of times threads were previously presented in the specific location of the interface.

7. The method of claim 6, wherein the probability of the user selecting the thread including at least one message that the user has not read when presented in the specific location of the interface corresponding to a position of the order is a ratio of the number of times the user previously accessed threads presented in the specific location of the interface to the number of times threads were previously presented in the specific location of the interface.

8. The method of claim 6, wherein the probability of the user selecting the thread including at least one message that the user has not read when presented in the specific location of the interface is further based on characteristics of the one or more receiving users included in the thread.

9. The method of claim 8, wherein characteristics of the one or more receiving users included in the thread are selected from a group consisting of: affinity between the user and a receiving user, prior actions between the user and the receiving user, common connections between the user and the receiving user, and any combination thereof.

10. A method comprising:
receiving a sponsored content item at an application executing on a client device, the application associated with an online system and the sponsored content item including content and a bid amount specifying an amount of compensation received by the online system;
retrieving a set of threads maintained by the online system, each thread including one or more messages between a user of the online system and at least one additional user of the online system;
determining an order of the set of threads, the order having threads including at least one message that the user has not read in higher positions than threads that do not include at least one message that the user has not read;
generating an interface displaying the set of threads in locations corresponding to positions in the order of the set of threads;
determining a probability of the user interacting with a thread at a selected location of the interface, wherein determining the probability further comprises:
determining dimensions of a display area of the client device,
identifying the selected location of the interface as a location of the interface visible on the display area and nearest a lower boundary of the display area, and
determining the probability of the user selecting the thread when presented at the selected location; and
responsive to determining the probability is less than a threshold value, displaying the interface to the user, the interface including the sponsored content item in the selected location and including at least one message that the user has not read in locations above the selected location.

11. The method of claim 10, wherein determining the order of the set of threads comprises:
determining times when messages were added to each thread of the set of threads; and
ordering the threads of the set of threads so threads to which messages were more recently added have higher positions in the order.

12. The method of claim 11, wherein ordering the threads of the set of threads so threads to which messages were more recently added have higher positions in the order comprises:
associating a thread to which a message was most recently added with a highest position in the order.

13. A computer program product comprising a non-transitory computer readable storage medium having instructions encoded thereon that, when executed by a processor cause the processor to:
receive a sponsored content item at an application executing on a client device and associated with an online system, the sponsored content item including content and a bid amount specifying an amount of compensation received by the online system;
retrieve a set of threads maintained by the online system, each thread including one or more messages between a user of the online system and at least one receiving user of the online system;
determine an order of the set of threads, the order having threads including at least one message that the user has not read in higher positions than threads that do not include at least one message that the user has not read;
generate an interface displaying the set of threads in positions corresponding to the order of the set of threads;
determine a probability of the user selecting a thread including at least one message that the user has not read when presented in a specific location of the interface corresponding to a position of the order, wherein the instructions further cause the processor to:
   determine dimensions of a display area of the client device,
   identify the specific location of the interface as a location of the interface visible on the display area and nearest a lower boundary of the display area, and
   determine the probability of the user selecting the thread when presented at the specific location; and
responsive to determining the probability of the user selecting the thread including at least one message that the user has not read when presented in the specific location of the interface corresponding to the position of the interface is less than a threshold value, display the sponsored content item in a location of the interface that is at the specific location of the interface and displaying the thread including at least one message that the user has not read in another location of the interface below the specific location of the interface.

14. The computer program product of claim 13, wherein the threshold value comprises the bid amount of the sponsored content item.

15. The computer program product of claim 14, wherein responsive to determining the probability of the user selecting the thread including at least one message that the user has not read when presented in the specific location of the interface is less than the threshold value comprises:
   responsive to determining a product of a conversion factor the probability of the user selecting the thread including at least one message that the user has not read when presented in the specific location of the interface is less than the bid amount of the sponsored content item.

16. The computer program product of claim 13, wherein the probability of the user selecting the thread including at least one message that the user has not read when presented in the specific location of the interface corresponding to a position of the order is based on a number of times the user previously accessed threads presented in the specific location of the interface to a number of times threads were previously presented in the specific location of the interface.

17. The computer program product of claim 16, wherein the probability of the user selecting the thread including at least one message that the user has not read when presented in the specific location of the interface corresponding to a position of the order is a ratio of the number of times the user previously accessed threads presented in the specific location of the interface to the number of times threads were previously presented in the specific location of the interface.

18. The computer program product of claim 16, wherein the probability of the user selecting the thread including at least one message that the user has not read when presented in the specific location of the interface is further based on characteristics of the one or more receiving users included in the thread.

19. The computer program product of claim 18, wherein characteristics of the one or more receiving users included in the thread are selected from a group consisting of: affinity between the user and a receiving user, prior actions between the user and the receiving user, common connections between the user and the receiving user, and any combination thereof.

* * * * *